Sept. 29, 1964 P. S. ADVANI ET AL 3,151,113
N-ALKYL MORPHOLINE PRODUCTION
Filed Feb. 19, 1962
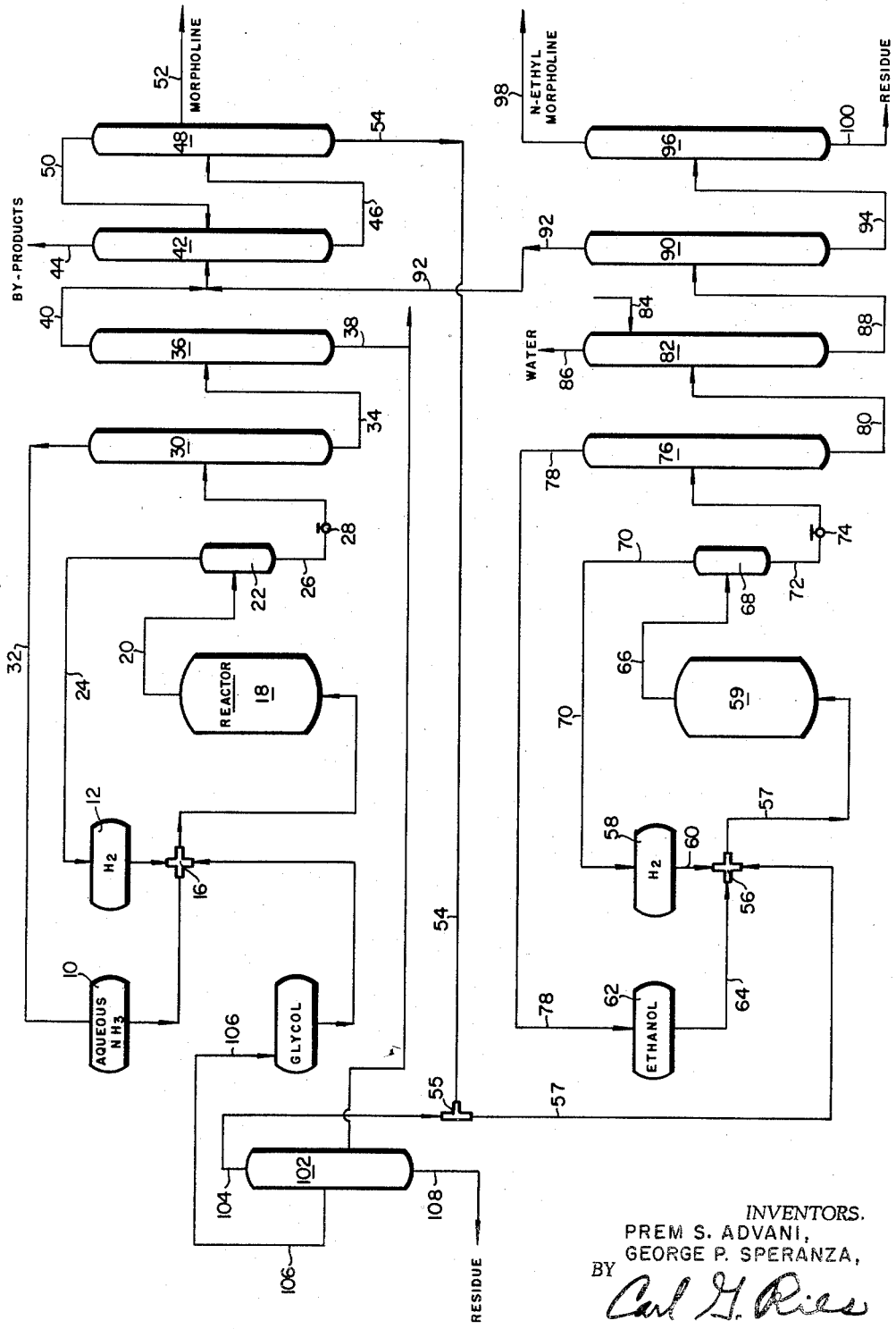
INVENTORS.
PREM S. ADVANI,
GEORGE P. SPERANZA,
BY
ATTORNEY.

3,151,113
N-ALKYL MORPHOLINE PRODUCTION
Prem S. Advani, Conroe, and George P. Speranza, Austin, Tex., assignors to Jefferson Chemical Company, Inc., Houston, Tex., a corporation of Delaware
Filed Feb. 19, 1962, Ser. No. 174,219
8 Claims. (Cl. 260—247)

This invention relates to a method for the preparation of N-alkyl morpholines. More particularly, this invention relates to an improved method for the production of N-alkyl morpholines.

In copending Godfrey application, Serial No. 71,876, filed November 28, 1960, and entitled "Method for Preparing N-Alkyl Morpholines," there is disclosed a method wherein a primary or secondary alcohol is reacted with morpholine at an elevated temperature and pressure in the presence of a catalyst, the active ingredient of which consists essentially of 50 to 100 wt. percent nickel or cobalt, or a mixture thereof, 0 to 50 wt. percent copper and 0 to 5 wt. precent of a non-reducible oxide promoter, such as chromium oxide, titanium oxide, thorium oxide, magnesium oxide, zinc oxide, manganese oxide, rare earth oxides, etc.

While this method gives satisfactory results, the nature of the reaction is such that it has heretofore been considered necessary to utilize morpholine as the feed stock for reaction with the primary or secondary alkanol.

It has now been surprisingly discovered in accordance with the present invention, however, that N-alkyl morpholines can be obtained from hydroxy and/or amino terminated diethylene ethers of the type that are normally produced as by-products when morpholines are prepared by the reaction of dialkylene glycols with ammonia in the presence of hydrogen as disclosed, for example, in copending application, Serial No. 585,930 filed May 21, 1956, and entitled "Process for Preparing Morpholines." A particular feature of the present invention is the preparation of N-alkyl morpholines by the reaction of a primary or secondary alcohol with a feed stock comprising a mixture of a morpholine and a 2-(2-hydroxyethoxy) ethylamine under the reaction conditions of the present invention.

The primary or secondary alcohol to be utilized in accordance with the present invention may be an alcohol containing from one to eighteen carbon atoms such as methanol, ethanol, propanol, isopropanol, butanol, isobutyl alcohol, octanol, dodecanol, etc., and mixtures thereof.

The diethylene ether feed stock is a feed stock having the formula:

Y—CHR—CHR—O—CHR—CHR—Y' wherein R is hydrogen or methyl and Y and Y' are —OH or —NH$_2$. Examples of such diethylene ethers include diethylene glycol, 2-(2-hydroxyethoxy) ethylamine (hereinafter referred to as diglycolamine), B,B'-bisaminoethyl ether, the methyl homologue thereof, such as dipropylene glycol, dibutylene glycol, 2-(3-hydroxypropoxy) propylamine, etc., and mixtures thereof.

Reaction conditions to be used should include a mol ratio of about 1 to 10 mols of alcohol per mol of diglycolamine, a temperature within the range of about 150° to 300° C., a reaction time within the range of about 10 minutes to five hours and a total reaction pressure (including from about 20 to 200 atmospheres partial pressure of hydrogen) sufficient to maintain the reaction mixture in liquid phase, such a pressure being in the range of about 500 to about 5000 p.s.i.g. More preferably, the reaction conditions will include a mol ratio of about 3 to 7 mols of alcohol per mol of diglycolamine, a temperature within the range of about 200° to about 250° C., a reaction time within the range of about 0.5 to 1.5 hours and a total reaction pressure within the range of about 2000 to 3000 p.s.i.g. (of which from about 40% to about 90% constitutes the partial pressure of hydrogen).

When the diethylene ether is a glycol, at least 1 mol and, preferably, from about 2 to 10 mols of ammonia per mol of diethylene ether should be included as a reactant. With other diethylene ethers, the use of ammonia is optional.

The catalyst to be employed in accordance with the present invention may be unsupported or supported on an inert carrier such as gamma-alumina, kieselguhr, etc., and comprises an active component consisting essentially of 50 to 100 wt. percent of nickel, cobalt or a mixture thereof, 0 to 50 wt. percent of copper and 0 to 5 wt. percent of an oxide promoter such as chromium oxide, titanium oxide, thorium oxide, magnesium oxide, zinc oxide, manganese oxide, rare earth oxides, etc., which is essentially non-reducible to metallic form under the reaction conditions of the present invention. A preferred catalyst comprises an active component consisting essentially of 50 to 90 wt. percent of nickel, 10 to 50 wt. percent of copper and 0.5 to 5 wt. percent of chromium oxide.

It will be understood that nickel, cobalt or copper oxides may be used in initially preparing the catalyst and that these components may be pre-reduced to metallic form (e.g., with hydrogen) prior to use or used, as such, whereby they will be reduced to metallic form during the course of the reaction.

Morpholines may also be present in the feed stock.

The process of the present invention may be conducted as a batch process, a continuous process or a semi-continuous process.

As adduced from the foregoing, the method of the present invention may be defined as a method for preparing an N-alkyl morpholine having the formula:

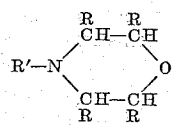

where R is selected from the group consisting of hydrogen and methyl and R' is an alkyl group containing 1 to 18 carbon atoms, said method comprising the steps of contacting:

(1) Hydrogen
(2) A diethylene ether, and
(3) An alcohol selected from the group consisting of primary and secondary alcohols containing 1 to 18 carbon atoms in the alkyl group with a catalyst under liquid phase reaction conditions including a temperature in the range from about 150° to 300° C., and recovering an N-alkyl morpholine corresponding to the diethylene ether and alcohol from the products of said reaction, (4) said catalyst comprising an active component consisting essentially of (a) 50 to 100 wt. percent of a first member selected from the group consisting of nickel, cobalt and mixtures thereof,
(b) 0 to 50 wt. percent of copper, and
(c) 0.5 to 5 wt. percent of a second member selected from the class consisting of chromium oxide, titanium oxide, thorium oxide, magnesium oxide, zinc oxide, manganese oxide, rare earth oxides and mixtures thereof, said diethylene ether having the formula:

Y—CHR—CHR—O—CHR—CHR—Y' wherein:

(5) R is selected from the group consisting of hydrogen and methyl, and
(6) Y and Y' are selected from the group consisting of hydroxyl and amino, said reaction being conducted in the presence of at least 1 mol of ammonia per mol of alkylene ether at least when Y and Y' are both hydroxyl.

The invention will be further illustrated with reference to the accompanying drawing wherein the single figure is a schematic flow sheet illustrating a preferred embodiment of the present invention.

Turning now to the drawing, there is disclosed a method for the sequential production of morpholine and N-ethyl morpholine. In accordance with this showing, an aqueous solution of ammonia from a storage tank 10, hydrogen from a storage tank 12 and diethylene glycol from the storage tank 14 are charged through a suitable manifold 16 to a reactor 18 containing an appropriate catalyst such as a catalyst containing nickel, copper and chromium oxide. Within the reactor 18, at least a portion of the diethylene glycol reacts with ammonia and other components of the reaction mixture present to form morpholine and by-products thereof including diglycolamine, N-methyl morpholine, N-ethyl morpholine, N-methoxyethyl morpholine, residue components and water.

The total reactor effluent is discharged from reactor 18 by way of a line 20 leading to a separator 22 wherein hydrogen is taken overhead by way of a line 24 for recycle.

The bottoms from separator 22 are discharged by way of a line 26 through a pressure relief valve 28 to a first distillation column 30 wherein water and ammonia are taken overhead by way of a line 32 for recycle to the storage tank 10.

The bottoms from tower 30 are taken by way of a line 34 to a second distillation column 36 wherein the reaction product is separated into an overhead fraction 40 rich in morpholine and a bottoms fraction 38 containing most of the heavy by-products of the reaction, the fraction 38 comprising unreacted diethylene glycol, diglycolamine and residue components. The bottoms fraction is discharged by way of a line 38 and may be discarded or further treated up in any suitable manner, such as in the manner to be described.

The overhead from tower 36 taken by way of a line 40 will contain water, N-ethyl morpholine, N-methyl morpholine, morpholine, N-methoxyethyl morpholine, diglycolamine, etc. This stream is charged to a third column 42 wherein a discard fraction composed of water, N-ethyl morpholine, N-methyl morpholine, etc., is taken overhead by line 44. The bottoms from tower 42 is charged by way of a line 46 to a fourth column 48 wherein the material is separated into a light overhead fraction 50 which is recycled to the tower 42, a heartcut distillate fraction 52 consisting essentially of morpholine which is taken as product and a bottoms fraction 54 which comprises a mixture of morpholine, methoxyethyl morpholine and diglycolamine. Normally, the fraction 54 will contain less than about 50% morpholine. The fraction 54 will also normally contain from about 20 to about 40 wt. percent of N-methoxyethyl morpholine, the balance consisting primarily of diglycolamine.

In accordance with one embodiment of the present invention, fraction 54 is utilized as a feed stock for the preparation of N-ethyl morpholine.

In accordance with this embodiment of the present invention, the fraction 54 is charged to a second manifold 55 and from thence by a line 57 to a third manifold 56, together with ethanol and hydrogen, hydrogen being taken from a storage tank 58 by way of a line 60 to the manifold 56 and ethanol being taken from the storage tank 62 by way of a line 64 to the manifold 56. From manifold 56, the materials are charged by a line 57 to a reactor 59 containing a catalyst, such as the same catalyst employed in reactor 18.

The effluent from reactor 59 is discharged by way of a line 66 leading to a separator 68 wherein hydrogen is taken overhead for recycle by way of a line 70.

The bottoms from separator 68 is discharged by way of a line 72 through a relief valve 74 to a fifth distillation column 76 wherein a distillate fraction composed of unreacted ethanol in water is taken overhead by way of a line 78 and recycled to storage tank 62.

The bottoms from tower 76 is discharged by way of a line 80 to a sixth distillation column 82 which is an azeotropic distillation column to which a suitable water azeotropic agent such as benzene is charged by way of a line 84 to thereby obtain the removal overhead by way of a line 86 of by-product water reaction.

The bottoms from the tower 82 is charged by way of a line 88 to a seventh column 90 wherein an overhead fraction composed principally of morpholine and N-methyl morpholine is taken by way of a line 92 and preferably recycled to column 42.

The bottoms from tower 90 is taken by line 94 to an eighth distillation column 96 wherein an overhead fraction composed principally of N-ethyl morpholine is taken overhead by way of line 98, the residue being discharged from column 96 for discard from the system by way of a line 100.

In accordance with another embodiment of the present invention, the bottoms fraction 38 from the second distillation column 36 is charged to a ninth distillation column 102 where it is separated into a light distillate fraction 104 consisting primarily of diglycolamine, a heavier distillate fraction 106 comprising diglycolamine and diethylene glycol and a residue bottoms fraction 108. In accordance with this embodiment, the fraction 104 is charged to the second manifold 55, whereby additional diglycolamine feed stock is provided for the reactor 59, and the fraction 106 is recycled to glycol storage tank 14.

It will be understood that, if desired, all or a portion of the diethylene glycol in line 38 or a portion of the diethylene glycol in storage tank 14 may be charged to the reactor 59. In this situation, however, it is preferable to employ at least 1 mol (and preferably, 2 to 5 mols) of ammonia per mol of diethylene glycol.

The invention will be further illustrated by following specific examples which are given by way of illustration and not as a limitation of the scope of this invention. Where parts are given they are parts by weight.

The nickel, copper, chrome catalyst referred to in the following examples is a catalyst prepared by the hydrogen reduction of a mixture of 75 wt. percent nickel oxide, 23% copper oxide and 2 wt. percent chrome (chromium oxide) whereby the nickel and copper oxides, but not the chromium oxide are reduced to metallic form.

EXAMPLE I

A bottoms fraction obtained from a commercial process for the production of morpholine was used which approximated a bottoms product having a composition such as the composition that might be encountered in the line 54 of the drawing. This feed stock was reacted with ethanol in the presence of water and hydrogen and in contact with a catalyst composed of nickel, copper and chrome. At the end of the reaction the total reactor effluent was analyzed and then separated into a reaction product which was also analyzed.

The analysis of the feed material, the reaction conditions employed and the analyses of the products are set forth in Tables I to IV respectively.

Table I
FEED COMPOSITION

| | Wt. percent |
|---|---|
| Morpholine | 48.1 |
| Methoxyethyl morpholine | 32.0 |
| Diglycolamine | 6.9 |
| Diethylene glycol | 6.9 |
| Others (heavies) | 6.1 |
| | 100 |

Table II
REACTOR OPERATING CONDITIONS

| | |
|---|---|
| Catalyst | 1 liter of nickel-copper-chrome. |
| Feed mixture: | |
|   Feed of Table I | 46.15 wt. percent. |
|   Ethanol | 30.8. |
|   Water | 23.05. |
| Liquid space velocity | 1.875 g./hr., ml. cat. |
| Reactor pressure | 2750 p.s.i.g. |
| Reactor temp., ° C.: | |
|   Bottom (inlet) | 190. |
|   6″ | 225. |
|   12″ | 247. |
|   Top (outlet) | 251. |
| Hydrogen feed rate | 125.1 (STP)/hr. |
| Steady state operating time | 4 hrs. |
| Liquid feed to reactor | 7510 g. |
| Recovered liquid product | 7183 g. |

Table III
ANALYSIS OF REACTOR EFFLUENT

| | Wt. percent |
|---|---|
| Ethanol, water, lights | 48.6 |
| N-methyl morpholine | 0.7 |
| Morpholine | 4.3 |
| N-ethyl morpholine | 29.0 |
| Methoxyethyl morpholine | 13.6 |
| Diglycolamine | 0.8 |
| Diethylene glycol | 0.8 |
| Others (heavies) | 2.6 |
| | 100 |

Table IV
REACTOR PRODUCT

| | Parts by weight per 100 parts feed composition to reactor |
|---|---|
| N-ethyl morpholine | 60.0 |
| Morpholine | 8.9 |
| N-methyl morpholine | 1.4 |
| Methoxyethyl morpholine | 28.2 |
| Diglycolamine | 0.8 |
| Diethylene glycol | 1.6 |
| Others (heavies) | 5.4 |
| | 106.3 |

Based on the foregoing results it was calculated that the conversion, if it were assumed that all of the N-ethyl morpholine precursor were morpholine, would be about 81.5%. However, the yield of N-ethyl morpholine calculated on the same basis was 116 mol percent. Obviously, therefore, the diglycolamine was also a precursor of N-ethyl morpholine. It is also to be observed that substantially complete conversion of the diglycolamine was obtained. Moreover, as is shown by Example II, the diglycolamine, surprisingly, is substantially selectively converted by reaction in the presence of ethanol into N-ethyl morpholine, whereby by-product morpholine production is minimal.

EXAMPLE II

To a 1400 ml. rocking autoclave was added 158 g. of diglycolamine (1.5 mols) and 138 g. of ethanol (3.0 mols) and 75 g. of a nickel-copper-chrome catalyst. The autoclave was assembled, the contents flushed twice with hydrogen and hydrogen added to 500 p.s.i.g. The reactants were heated for three hours at 220° C. and 1500 p.s.i.g. The product was filtered and in addition to recovered ethanol and diglycolamine there was obtained one gram of morpholine and 101 g. of N-ethyl morpholine. The yield of N-ethyl morpholine was 58% basis diglycolamine charged.

EXAMPLE III

The run above was repeated except that 96 g. of methanol was substituted for the ethanol. There was obtained 61.5 g. of N-methyl morpholine and 1.9 g. of morpholine. The yield of N-methyl morpholine basis diglycolamine charged was 41%.

EXAMPLE IV

To a 1400 ml. rocking autoclave was added 212 g. of diethylene glycol, 115 g. of ethanol, and 75 g. of nickel-copper-chrome catalyst. The autoclave was assembled, the contents flushed twice with hydrogen, and 170 g. of ammonia added. Hydrogen was added to 400 p.s.i.g. and the contents heated to 220° C. and held for 4 hours. The pressure dropped from 3300 p.s.i.g. to 2300 p.s.i.g.

The filtered product weighed 351 g. The filtered product was analzyed and distilled to prove the production of N-ethyl morpholine. There was obtained 91 g. of N-ethyl morpholine (40% yield basis DEG charged), 8.7 g. of diglycolamine, 6.0 g. of diethylene glycol and 9.4 g. of morpholine.

EXAMPLE V

The run above was repeated except that 80 g. of methanol was substituted for ethanol. N-methyl morpholine was obtained along with morpholine and diglycolamine as the main products.

EXAMPLE VI

To a 1400 ml. rocking autoclave was added 130 g. of isooctyl alcohol, 106 g. of diethylene glycol and 75 g. of a cobalt-copper-chrome catalyst. The contents were flushed with hydrogen and 85 g. of ammonia was added. Hydrogen was added to 500 p.s.i.g. The contents were heated to 240° C. and held at this temperature and at 2475 to 2100 p.s.i.g. for four hours. The filtered product consisted of two layers—upper layer 140 g. lower layer 95 g. The upper layer was distilled at 10 mm. through 2.5×25 cm. of SS packing and 26 g. of isooctylmorpholine was obtained boiling at 115° to 130° C. at 10 mm. The catalyst was prepared by hydrogen reduction of a mixture of 75 wt. percent cobalt oxide, 23% copper oxide and 2% chrome.

EXAMPLE VII

To the same autoclave as used above was added 195 g. of isooctyl alcohol, 179 g. of diglycolamine and 75 g. of nickel-copper-chrome catalyst. The contents were flushed twice with hydrogen and hydrogen added to 400 p.s.i.g. After four hours at 240° C. and 1200 p.s.i.g. there was obtained an organic layer which weighed 245 g. It was distilled at 10 mm. and 53 g. of isooctylmorpholine was obtained boiling 110° to 115° C. with a neutral equivalent of 200. An infrared spectra of this fraction was identical to authentic N-isooctyl morpholine.

EXAMPLE VIII

To a 1400 ml. rocking autoclave was added 138 g. of ethanol, 158 g. of diglycolamine and 75 g. of a reduced cobalt catalyst. The contents were flushed with hydrogen and hydrogen added to 500 p.s.i.g. After four hours at 220° C. and 1000 p.s.i.g., there was obtained 81.7 g. of N-ethylmorpholine (yield basis diglycolamine charged was 47.3%).

Having thus described our invention what is claimed is:
1. A method for the production of a heterocyclic amine selected from the group consisting of a morpholine of the formula:

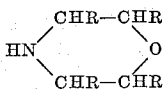

an N-alkylmorpholine of the formula:

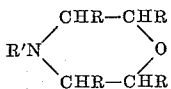

and mixtures thereof wherein the corresponding R groups in the morpholine and the alkylmorpholine have the same values, which comprises (A) reacting the corresponding diethylene ether of the formula:

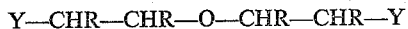

with
(a) hydrogen,
(b) from 1 to 10 mols of ammonia and
(c) from 1 to 10 mols of an alcohol selected from the group consisting of primary and secondary aliphatic alcohols containing from 1 to 18 carbon atoms, over
(d) a hydrogenation catalyst under liquid phase reaction conditions including a temperature within the range of from about 150° to about 400° C. and a pressure in the range of about 500 to about 5,000 p.s.i.g. to provide a reaction mixture consisting primarily of said morpholine, said N-alkylmorpholine, unreacted alcohol, unreacted diethylene ether and a corresponding hydroxyalkoxyalkylamine with lesser amounts of N-substituted morpholines of the formula:

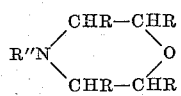

and residue components and
(B) separating said reaction mixture into fractions including
(a) a first product fraction consisting essentially of said morpholine,
(b) a second product fraction consisting essentially of said N-alkylmorpholine,
(c) a third fraction comprising unreacted alcohol,
(d) a fourth fraction comprising unreacted diethylene ether and a corresponding hydroxyalkoxyalkylamine and
(e) a fifth residue fraction,
(C) R being selected from the group consisting of hydrogen and methyl,
(D) R' being an alkyl group containing from 1 to 18 carbon atoms,
(E) R'' being selected from the group consisting of
—CH$_2$R, —CHRCH$_2$R, and —CHRCHROCH$_2$R
(F) Y being selected from the group consisting of hydroxyl and amino and
(G) said hydrogenation catalyst comprising a catalytically active component consisting essentially of from about 50 to about 100 wt. percent of a first member selected from the group consisting of nickel, cobalt and mixtures thereof, 0 to 50 wt percent of copper and 0 to 5 wt. percent of a second member selected from the group consisting of chromium oxide, thorium oxide, magnesium oxide, zinc oxide, manganese oxide, oxides of the rare earth metals and mixtures thereof.

2. A method as in claim 1 wherein R is hydrogen, Y is hydroxyl, the aliphatic alcohol is methanol and the hydrogenation catalyst comprises catalytically active components consisting essentially of from about 50 to about 90 wt. percent of nickel, from about 10 to about 50 wt. percent of copper and from about 0.5 to about 5 wt. percent of chromium oxide.

3. A method as in claim 2 wherein the aliphatic alcohol is ethanol.

4. A method as in claim 2 wherein the aliphatic alcohol is isooctyl alcohol.

5. In a method for the production of a morpholine of the formula:

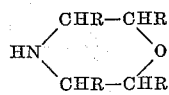

by reacting a corresponding diethylene ether of the formula:

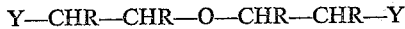

with hydrogen and ammonia over a hydrogenation catalyst at a temperature of about 150° to about 400° C. and a pressure of about 30 to about 400 atmospheres and separating the reaction mixture into said desired morpholine and by-products, the improvement which comprises:

(A) separating said by-products into at least a fraction containing said morpholine and a corresponding hydroxyalkoxyalkylamine,
(B) separately reacting said fraction with
(a) hydrogen and
(b) an alcohol selected from the group consisting of primary and secondary aliphatic alcohols containing from 1 to 18 carbon atoms, the molar ratio of said alcohol to said morpholine and said hydroxyalkoxyalkylamine being from about 1:1 to about 10:1, over
(c) a hydrogenation catalyst under liquid phase reaction conditions including a temperature within the range of from about 150° to about 400° C. and a pressure in the range of about 500 to about 5,000 p.s.i.g. to provide a second reaction mixture, and
(C) separating said second reaction mixture into at least a second product fraction consisting essentially of an N-alkylmorpholine of the formula:

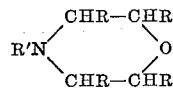

(D) R being selected from the group consisting of hydrogen and methyl,
(E) R' being an alkyl group containing from 1 to 18 carbon atoms,
(F) Y being selected from the group consisting of hydroxyl and amino and
(G) said hydrogenation catalyst comprising a catalytically active component consisting essentially of from about 50 to about 100 wt. percent of a first member selected from the group consisting of nickel, cobalt and mixtures thereof, 0 to 50 wt. percent of copper and 0 to 5 wt. percent of a second member selected from the group consisting of chromium oxide, titanium oxide, thorium oxide, magnesium oxide, zinc oxide, manganese oxide, oxides of the rare earth metals and mixtures thereof.

6. A method as in claim 5 wherein R is hydrogen, Y is hydroxyl, the aliphatic alcohol is methanol and the hydrogenation catalyst comprises catalytically active components consisting essentially of from about 50 to about 90 wt. percent of nickel, from about 10 to about 50 wt. percent of copper and from about 0.5 to about 5 wt. percent of chromium oxide.

7. A method as in claim 6 wherein the aliphatic alcohol is ethanol.

8. A method as in claim 6 wherein the aliphatic alcohol is isooctyl alcohol.

No references cited.